(12) United States Patent
Steinfort et al.

(10) Patent No.: US 7,690,141 B2
(45) Date of Patent: Apr. 6, 2010

(54) TAGGING ANIMALS

(76) Inventors: John James Steinfort, 79 Mirboo North Road, Mirboo North, Vic (AU) 3871; Neil Frederick Edney, 28 Giles Street, Mirboo North, Vic (AU)

( * ) Notice: Subject to any disclaimer, the term of this patent is extended or adjusted under 35 U.S.C. 154(b) by 1384 days.

(21) Appl. No.: 10/532,189

(22) PCT Filed: Sep. 30, 2003

(86) PCT No.: PCT/AU03/01282

§ 371 (c)(1),
(2), (4) Date: Apr. 21, 2005

(87) PCT Pub. No.: WO2004/036984

PCT Pub. Date: May 6, 2004

(65) Prior Publication Data

US 2006/0047287 A1 Mar. 2, 2006

(30) Foreign Application Priority Data

Oct. 22, 2002 (AU) .............................. 2002952186

(51) Int. Cl.
*G09F 3/00* (2006.01)
(52) U.S. Cl. ......................................... 40/301; 119/655
(58) Field of Classification Search .................. 40/301; 119/655, 602; 424/411
See application file for complete search history.

(56) References Cited

U.S. PATENT DOCUMENTS

| 1,376,223 | A | * | 4/1921 | Pannier ......................... 40/301 |
| 1,390,342 | A | * | 9/1921 | Delay .......................... 40/301 |
| 3,958,353 | A | * | 5/1976 | Hayes .......................... 40/301 |
| 4,425,726 | A | * | 1/1984 | Dvorak ........................ 40/301 |
| 4,718,697 | A | * | 1/1988 | Berardus van Amelsfort ............. 283/107 |
| 5,461,807 | A | * | 10/1995 | Johnson ....................... 40/301 |
| 5,588,234 | A | * | 12/1996 | de Jong et al. ................ 40/301 |

FOREIGN PATENT DOCUMENTS

| DE | 29706633 U1 | 4/1997 |
| EP | 754406 A1 * | 1/1997 |
| NZ | 176913 | 9/1976 |
| WO | WO 94/14316 A1 | 7/1994 |
| WO | WO 99/29167 A1 | 6/1999 |
| WO | WO 01/54490 A1 | 8/2001 |

* cited by examiner

*Primary Examiner*—Joanne Silbermann
*Assistant Examiner*—Kristina Staley
(74) *Attorney, Agent, or Firm*—Kirk Hahn (57) ABSTRACT

An animal tag comprising,
a penetrating component (3) having two ear penetrating members (9) joined by a strip of intermediate material (13),
a complementary component (15) having a locking portion (17) for each penetrating member, and
ramp means (21) for each locking portion,
wherein the arrangement is such that the ear penetrating members are designed to be passed through the ear (33) of an animal and to lock onto the locking portions to sandwich the ear in a gap (28) between the penetrating component and complementary component and the ramp means are arranged to co-operate with the skin penetrating members to vary the size of the gap whereby to provide a range of gap sizes to accommodate varying ear thicknesses and/or growth of the animal.

11 Claims, 11 Drawing Sheets

TAGGING ANIMALS

This application is the U.S. National Phase under 35 U.S.C. §371 of International Application PCT/AU2003/001282, filed on Sep. 30, 2003, which claims priority to Australian Patent Application No. 2002952186, filed on Oct. 22, 2002. All publications, patents, patent applications, databases and other references cited in this application, all related applications referenced herein, and all references cited therein, are incorporated by reference in their entirety as if restated here in full and as if each individual publication, patent, patent application, database or other reference were specifically and individually indicated to be incorporated by reference.

FIELD OF THE INVENTION

The present invention relates in general terms to improvements in or relating to animal tagging and to methods for tagging animals. More particularly, but not exclusively, the invention relates to an improved tag label or like means (hereinafter referred to as "a tag") for use with animals for a range of purposes which may include allowing for ready identification and/or tracking thereof (for whatever reason).

BACKGROUND OF THE INVENTION

In accordance with the known art, the tagging of animals for purposes of ready identification, tracking or monitoring of movements, etc has involved the use of a tag or the like means of a unitary kind having first and second portions held together, at or adjacent an extremity of each portion, by an intermediate region. The arrangement is such that a distal extremity of a first portion can be passed through an aperture made in the ear of the animal, for example, with the overall tag then being arranged such that the intermediate portion rests positioned through the ear and the respective first and second portions extend, at least to some extent, over the ear of the animal. Such a form of tag has enjoyed wide acceptance and is applied by taking an appropriate applicator or tool to make a hole in the ear of the animal (be it a sheep, cow, horse or in fact any type of animal, domestic or otherwise) just in from an edge thereof, then prising the respective first and second portions of the aforementioned tag apart so as to enable one of those portions to be inserted through the hole thus created, the two portions then being manipulated into such a condition that the intermediate portion rests through the hole formed in the ear of the animal, thereby to allow the respective first and second portions to assume a substantially parallel configuration. It has been found, however, that such tags, despite their long-standing market acceptance, have nonetheless exhibited certain drawbacks or disadvantages. To be more specific, and by way of example only, there exists a significant possibility of such a tag or identification means being deliberately or inadvertently displaced or removed, as for example by the animal rubbing its ear—or for that matter the relevant part of its anatomy where any such tag is located—against any given surface, catching the ear on any form of obstacle, etc. As well, readability of an ear tag can often present difficulties. Furthermore, tags can be a source of infection if incorrectly designed or applied.

It is an object of the invention to provide a tag which obviates or ameliorates one or more of the aforesaid difficulties.

DISCLOSURE OF THE INVENTION

The invention provides in one aspect an animal tag comprising, a penetrating component having two ear penetrating members joined by a strip of intermediate material, a complementary component having a locking portion for each penetrating member, and ramp means for each locking portion, wherein the arrangement is such that the ear penetrating members are designed to be passed through the ear of an animal and to lock onto the locking portions of the complementary component to sandwich the ear in a gap between the penetrating component and complementary component and the ramp means are arranged to co-operate with the skin penetrating members to vary the size of the gap whereby to provide a range of gap sizes to accommodate varying ear thicknesses and/or growth of the animal.

In another aspect the invention provides an animal tag comprising, a penetrating component having two ear penetrating members joined by a strips of intermediate material, a complementary component having a locking portion for each penetrating member, and a joining portion extending between and joined to the locking portions, wherein the arrangement is such that the ear penetrating members are designed to be passed through the ear of an animal and to lock onto the locking portions to sandwich the ear in a gap between the penetrating component and complementary component and the joining portion extends into the gap so as to provide circulation regions around the two ear penetrating members where the gap is increased in width compared with the region of the gap between the joining portion and the ear.

Either of the two components may be fitted with a transponder. The transponder may include means to identify the animal electronically and/or to locate the animal and/or to allow it to be tracked. The transponder may be located on the intermediate material. The transponder may include aerial means. The aerial means may comprise a coil which lies substantially co-planar with the plane of the intermediate material.

For a transponder arranged in this fashion, an aerial directed parallel to the plane of the coil may be used for efficient generation and reception of electrical signals between the transponder and the aerial.

The penetrating component and/or complementary component may be formed of plastics material. They may each be integrally formed of plastics material. They may be formed of thermoplastic polyurethane, rubber, combinations of these two or other similar materials. The penetrating members may additionally or alternatively include hard material such as hard plastic or metal to assist with piercing of the ear.

Suitably, the plastic forming the material of the penetrating component may generally be a plastic of a softer shore hardness than the material of the complementary component. This is to allow the penetrating component to flex more readily in a manner which will be described hereinafter.

The ear penetrating members of the penetrating component may end in an ear piercing head. The ear piercing head may have a generally arrow head shape. It may be joined to a tubular portion of the ear penetrating member which connects to the intermediate material. The join between the tubular portion and the arrow head may define a step shoulder between the two which may be suitable for causing locking with the locking portion of the complementary component.

The locking portion of the complementary component may comprise a slot. It may be designed so that the arrow head may be snap fitted or twisted through the slot so that the step of the arrow head catches underneath the bottom sides of the slot.

The complementary component may have two such slots which are joined by a joining portion which sits higher than the level of the slots.

The ramp means may be provided beneath each of the slots. The ramp means may slope from a thicker ramped portion more centrally in the complementary component towards a thinner portion at the edges of the complementary component.

In an alternative embodiment of the invention, the transponder may be attached to the complementary component. It may be located in a tubular member attached to the joining portion of the complementary component. It may be housed in the tubular portion with an aerial coil coaxial with the axis of the tubular portion. In such an instance, the aerial should again be placed to extend in a plane parallel to the plane direction of the coils in the transponder.

The complementary component may be provided with a marker or flag. The transponder may be affixed to the marker or flag especially in the form of a coil in abutment with the flag over one side of the flag.

It is noted that the location of a transponder for higher frequencies is preferably on the penetrating component as it will be positioned on top of the ear. A lower frequency transponder may be located in a housing associated with the complementary component underneath the ear. A high frequency transponder may typically operate in the MHz range typically at about 13.56 MHz whereas a low frequency transponder may typically operate in the kHz range at about 134.2 kHz. A marker may be attached to the complementary component. It may be attached via attachment to the housing for the transponder. Thus it may be arranged to hang from beneath the ear of an animal to which the tag has been attached.

In another aspect, the invention provides a method of tagging the ear of an animal comprising applying a tag as hereinbefore described to the ear of the animal so that the two ear penetrating members are located to pass through the top of the animal's ear with both ear penetrating members located between vascular ridges running lengthwise along the underneath surface of the ear. In the case of high frequency transponders, suitably, the tag will be located closer to the head of the animal for cattle than to the distal extremity of the ear. For sheep the tag may be located closer to the distal extremity. In the case of sheep the tag should suitably be located on the horizontal part of the ear. For cattle, it may be located on the generally vertical part of the ear with the penetrating component on the outside part of the ear.

It has been found that animals tagged in this way are less likely to suffer from damage to the ear if care is taken to avoid the vascular ridges. Also, there is less likelihood of the tag being removed by the animal rubbing the ear if it has two points of attachment.

Preferred aspects of the invention will be now be described with reference to the accompanying drawings.

DESCRIPTION OF THE DRAWINGS

The various elements identified by numerals in the drawings are listed in the following integer list.

| Integer List | |
|---|---|
| 1 | Animal tag |
| 3 | Penetrating component |
| 5 | Locking component |
| 7 | Transponder |
| 8 | Coiled antenna |
| 9 | Ear penetrating member |
| 10 | Tubular portion |
| 11 | Ear piercing head |
| 12 | Step |
| 13 | Joining strip |
| 15 | Opening |
| 17 | Locking slot |
| 19 | Joining portion |
| 21 | Ramp |
| 23 | Recessed portion |
| 25 | Implant tool |
| 27 | Implant pin |
| 28 | Gap |
| 29 | Body |
| 30 | Gap |
| 31 | Projection |
| 32 | Gap |
| 33 | Sheep's ear |
| 34 | Gap |
| 35 | Vascular ridge/vein |
| 37 | Aerial |
| 50 | Locking component |
| 52 | Tubular holder |
| 54 | Marker/flag |
| 56 | Cow ear |
| 57 | Transponder |
| 58 | Coil |
| 67 | Antenna |
| 80 | Animal tag |
| 83 | Penetrating component |

-continued

| Integer List | |
|---|---|
| 85 | Locking component |
| 87 | Transponder cap |
| 89 | Ear penetrating member |
| 90 | Tubular portion |
| 91 | Ear piercing head |
| 92 | Step |
| 93 | Joining strip |
| 94 | Flange |
| 95 | Opening |
| 97 | Locking slot |
| 98 | Cap |
| 99 | Joining portion |
| 100 | Marker/flag |
| 101 | Slot |
| 120 | Animal tag |
| 123 | Penetrating component |
| 125 | Locking component |
| 127 | Transponder cap |
| 128 | Transponder |
| 129 | Ear penetrating member |
| 133 | Joining strip |
| 138 | Cap |
| 139 | Joining portion |
| 141 | Slot |
| 142 | Slot |
| 145 | Marker/flag |
| 147 | Cover portion |
| 149 | Retainer portion |
| 150 | Hinge |
| 152 | Recess |
| 154 | Projection |
| 156 | Socket hole |
| 158 | Locater projection |
| 160 | Cow ear |
| 162 | Vein/vascular ridge |
| 163 | Hollow |
| 164 | Sheep ear |
| 165 | Gap |
| 166 | Gap |
| 167 | Gap |
| 168 | Gap |

Figure 1:
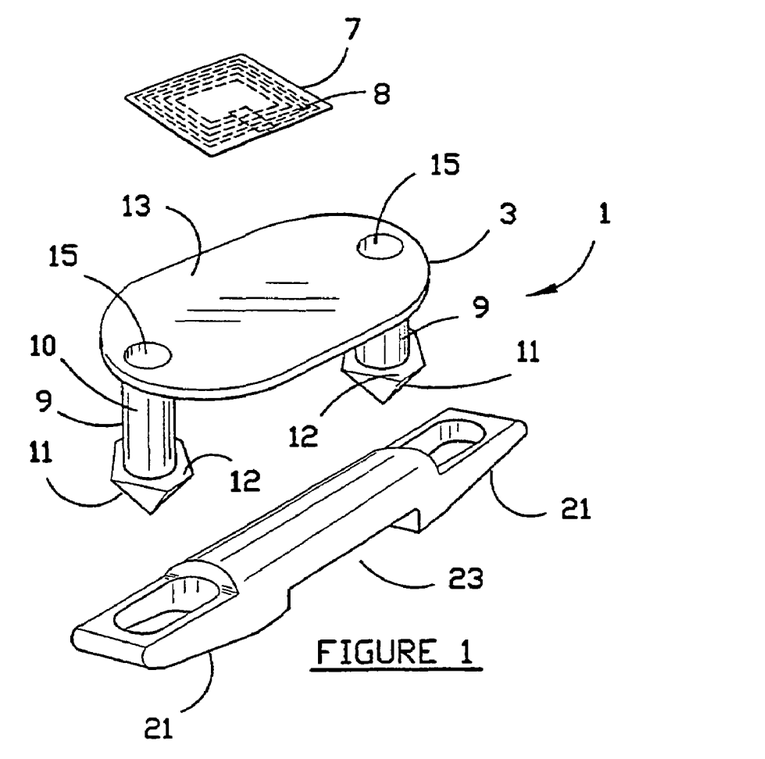
FIG. 1 shows an exploded view of an animal tag according to the invention.
Figure 2:
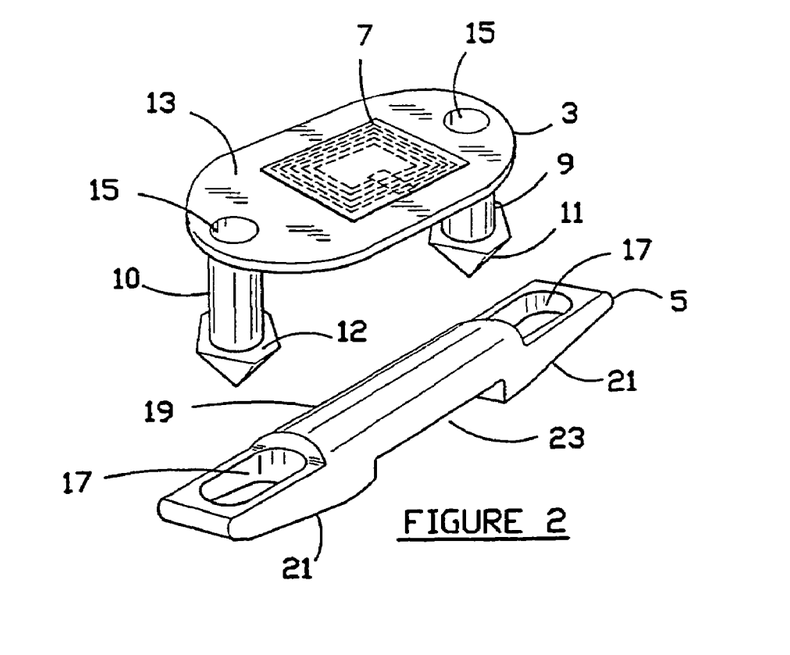
FIG. 2 shows an exploded view of an animal tag with transponder secured in place.
Figure 3:
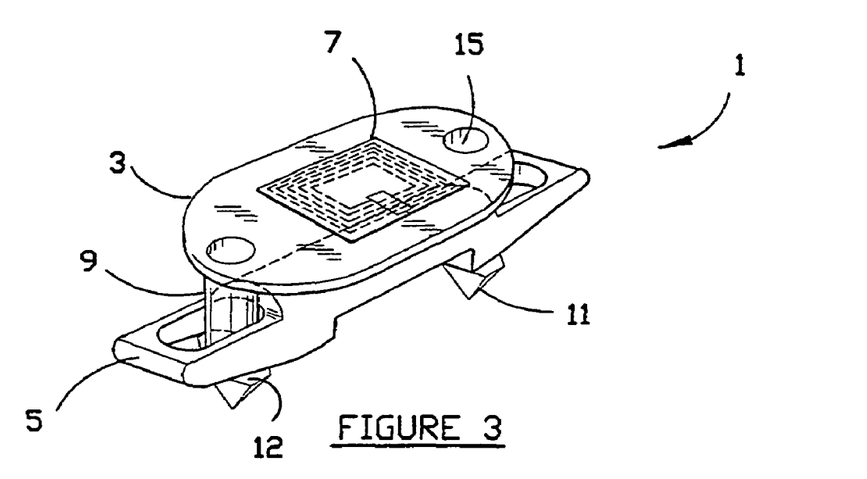
FIG. 3 shows the animal tag of FIG. 2 assembled.

Referring to FIGS. 1 to 3, there is shown an animal tag 1 which comprises a penetrating component 3, a locking component 5 and a transponder 7.

Both the penetrating component and locking component may each be formed of injection moulded plastics material such as thermoplastic polyurethane or polyurethane/rubber.

The transponder has a coiled antenna 8 which lies in the plane of the joining strip 13 joining the two ear penetrating members 9 on either side of the penetrating component. The joining strip is preferably flexible to permit flexing of the penetrating component to assist with application of the tag and to allow for growth. It is noted that the ear penetrating members are located very close to the opposed edges of the joining strip 13 so as to leave little or no scope for an animal to be able to catch the edge under a wire or branch to remove the animal tag.

The transponder may include electronic means for holding and transmitting data to the animal. It may also be capable of being updated with information via an external source such as a radio transmitter.

Each of the ear penetrating members comprises a tubular portion 10 with walls having a thickness range generally between 0.2 and 1 mm, more preferably 0.4 to 0.8 mm. Each of the tubular portions terminates at one end in a join with the joining strip 13 leaving an opening 15 for purposes to become apparent.

The other end of the tubular portion in each instance is provided with the ear piercing head 11 in the form of an arrow head, the join between the tubular portion and arrow head forming a step 12. It can be seen from FIG. 3 that the step 12 can lock underneath the edges of the ramp 21 forming part of the locking component.

The ear piercing heads may include cutting edges of a material such as hardened plastic or steel to assist with pushing the arrow heads through the ear of an animal.

It should also be noted that the arrow head forming the ear piercing head may have a hexagonal cross section. It may have other alternative cross sectional shapes such as round ellipsoid or polygonal. It may be snap or force fitted through the locking slots 17 formed in the locking component.

The joining portion 19 between the two locking slots is raised relative to the height of the locking slots for purposes to become apparent. A recessed portion 23 is formed under the joining portion 19.

The underneath edges of the locking slots are formed as ramps 21 which are in the form of wedges, the thicker end of the wedges being nearer the centre of the locking component tapering to a thinner edge towards the outer edges of the locking component.

Figure 4:
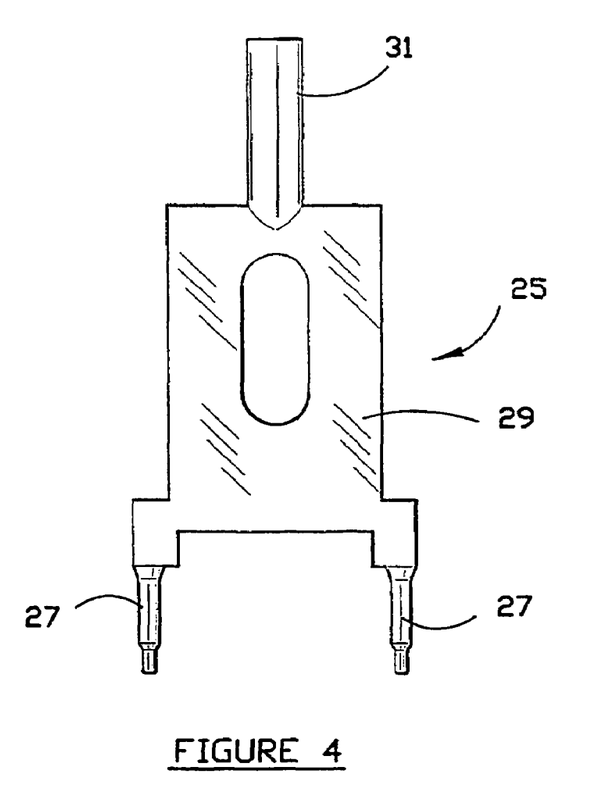
FIG. 4 shows a plan view of an implant tool.

For this purpose, an implant tool 25 shown in FIG. 4 may be used in association with a tag applicator to apply the tag to the ear of an animal. Applicant's co-pending international application PCT/AU02/00508 describes how an applicator could be used in this fashion. The disclosures in the said international application are by this cross reference deemed to be incorporated herein. It can be seen that the implant tool 25 includes two implant pins 21 which are shaped so that they can fit snugly through the openings 15 and into the tubular portions 10 of the ear penetrating members 9. The implant pins serve to hold the ear penetrating members rigid as they might otherwise collapse when they are pressed into the ear of an animal.

The implant tool 25 also includes a body 29 joining the two implant pins and a projection 31 upon which pressure may be exerted to bear down upon the implant pins and hence push the ear piercing heads through the ear.

Figure 5:
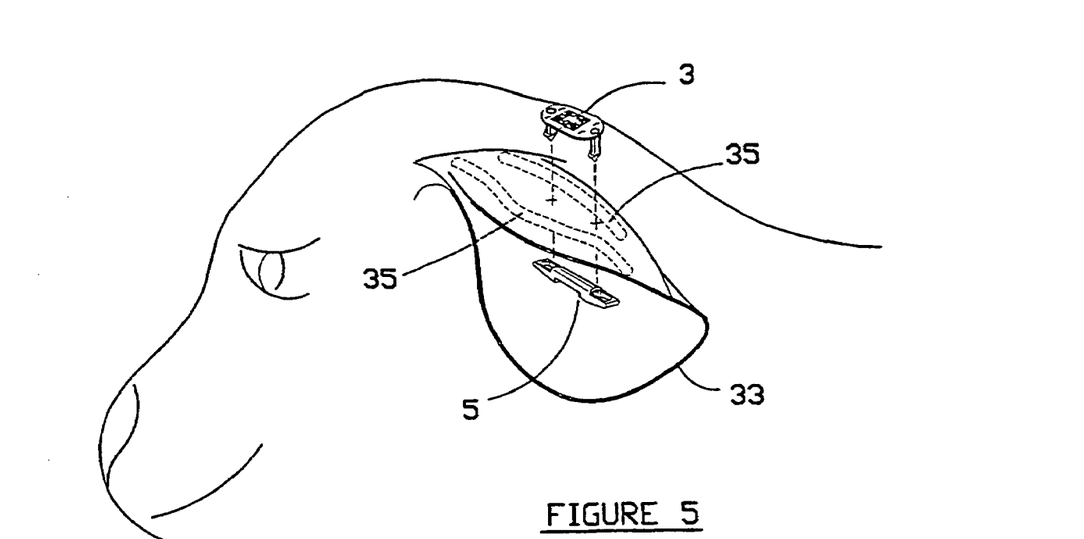
FIG. 5 shows the animal tag about to be applied to a sheep's ear.
Figure 6:
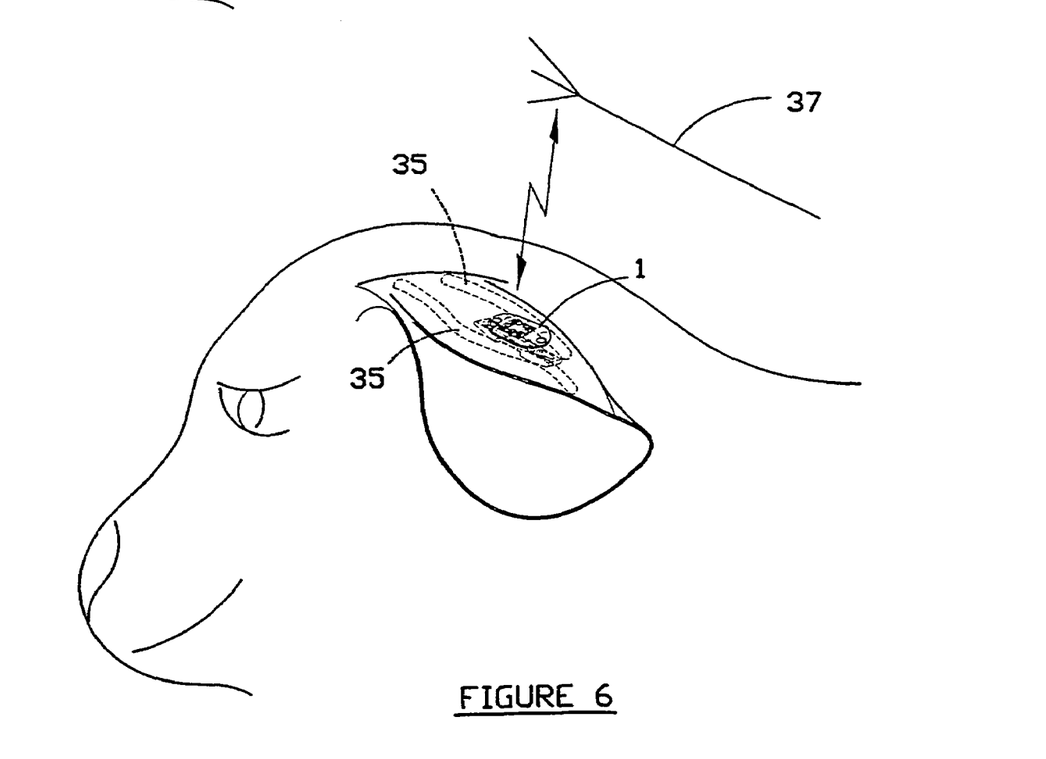
FIG. 6 shows the animal tag applied to a sheep's ear.
Figure 7:
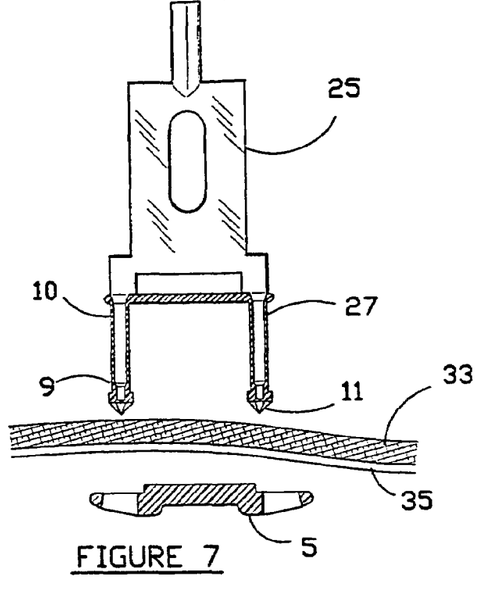
FIG. 7 shows a view of the animal tag prior to application to the ear.

Referring to FIGS. 5 and 6, it can be seen that the tag is applied to the ear of a sheep closer to the edge of the ear than to the head with the ear penetrating members between and aligned with the vascular ridges 35. By applying the tag in this fashion, it is held in a secure position in a firm manner. The fact that the locking component and the skin penetrating heads are held clear of the vascular ridges serves to reduce the likelihood of inflammation or infection being caused to the animal by attachment of the tag. The radius of the joining portion means that it can act as a spacer and a locator in the hollow between the vascular ridges/veins.

Figure 8:
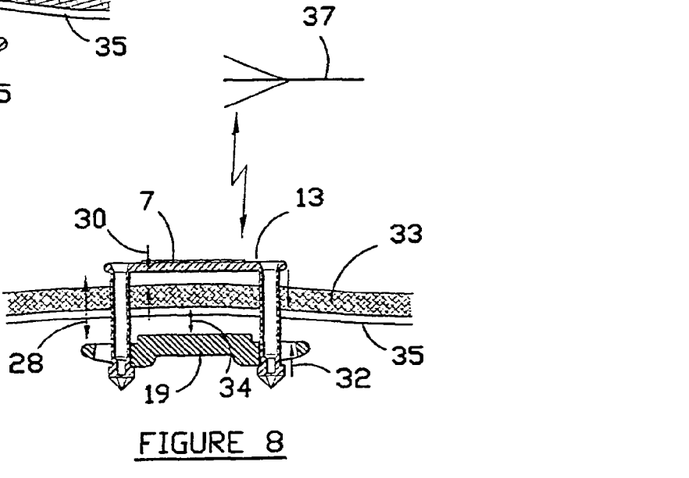
FIG. 8 shows the animal tag applied to an ear.

Referring to FIG. 8, the animal tag is shown after it has been fitted to a sheep's ear 33 with the ear sandwiched between the penetrating component and locking component in a gap between the two broadly designated by the numeral 28. The joining portion 19 extends in to a gap 34 between the inner surface of the ear and the locking component. It has a radius which mimics the curvature of the internal surface of the ear to reduce irritation produced by movement of the tag. Typically, the radius of curvature will lie between 2 mm and 9 mm. For sheep it may be about 3.5 mm and for cattle it may be about 7 mm.

It can be seen that the joining portion 19 because it is raised, sandwiches the ear 33 between the penetrating component and locking component leaving larger gaps 32 between the ear and the locking slot 17 and smaller gaps 30 and 34 between the penetrating component and ear as well as between the joining portion 19 and the ear. By designing gaps of this type, there is room for air to contact the small wounds caused by penetration of the ear and hence the rate of healing of the wound can be improved and infection minimised as infection of ears from prior art tagging processes tends to occur on the inside section of the ear. Gap sizes for sheep typically fall within the following ranges:

| Gap Number | Gap Size |
| --- | --- |
| 28 | 10 to 24 mm |
|  | Preferably 12 mm to 20 mm |
| 30 | 0 to 4 mm |
|  | Preferably 0 to 2 mm |
| 32 | 2 to 16 mm |
|  | Preferably 3 mm to 11 mm |
| 34 | 0 to 6 mm |
|  | Preferably 0 to 3 mm |

Because the coils of the transponder lie parallel to the plane of the joining strip 13, it is preferred that the orientation of an aerial 37 be parallel to this plane in order to maximise efficiency of transmission between the two. Thus the aerial 37 may typically extend above a race.

Figure 9:
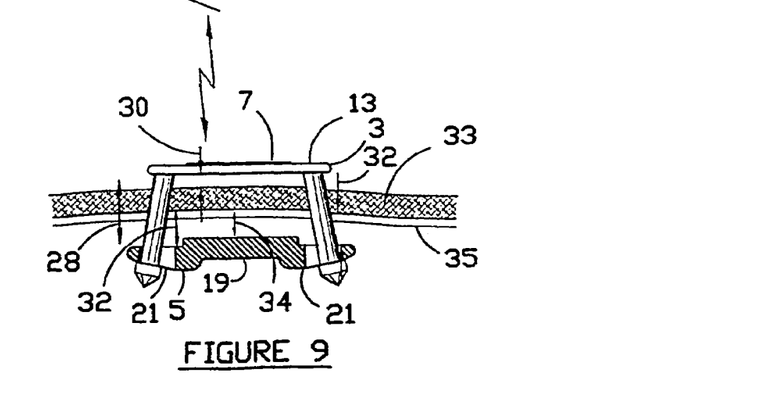
FIG. 9 shows the animal tag applied to an ear after the animal has grown.

Referring to FIG. 9, the drawing shows the change in appearance of the tag as the animal grows from the size in FIG. 8. With normal growth, the thickness of the ear may increase and also the length. This results in the ear penetrating members 9 splaying outwards in the manner shown in FIG. 9 so that the arrow heads are located at the narrower portion of the wedge or ramp 21. This turn creates a greater clearance 28 between the locking component 5 and the bottom of the joining strip 13 thereby accommodating an increase in the thickness of the ear whilst at the same time accommodating growth in the length of the ear as well.

Because the walls of the tubular portion are relatively thin they can compress and, they will only exert slight resilient pressure to hold the tag in place whilst still allowing sufficient flexibility to accommodate growth in the manner described. The same feature also accommodates different animal sizes in a similar fashion.

Figure 10:
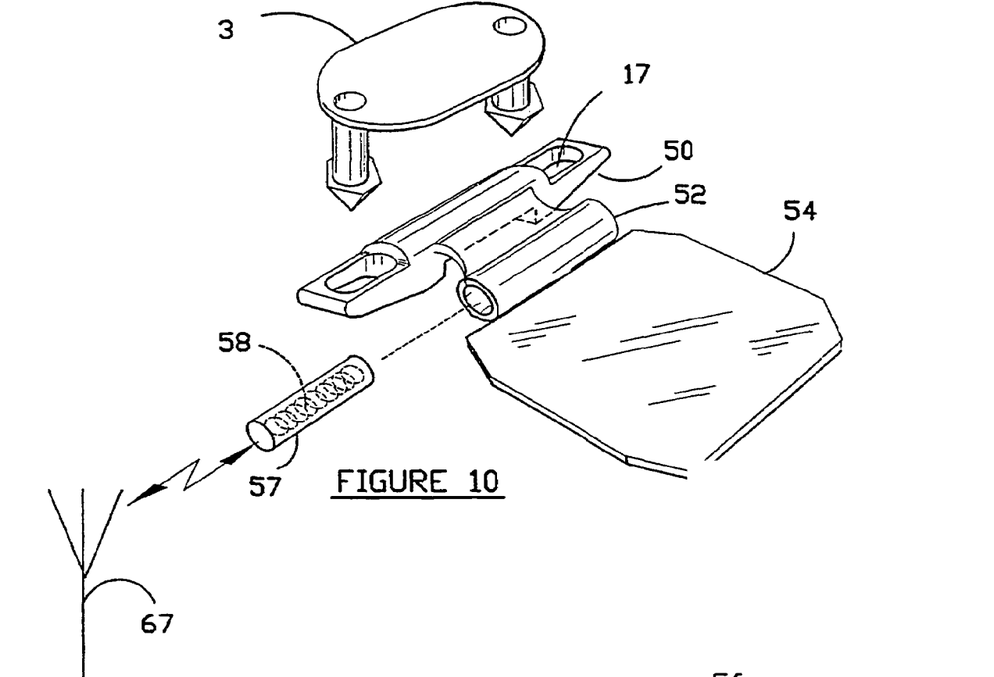
FIG. 10 shows an alternative form of animal tag.
Figure 11:
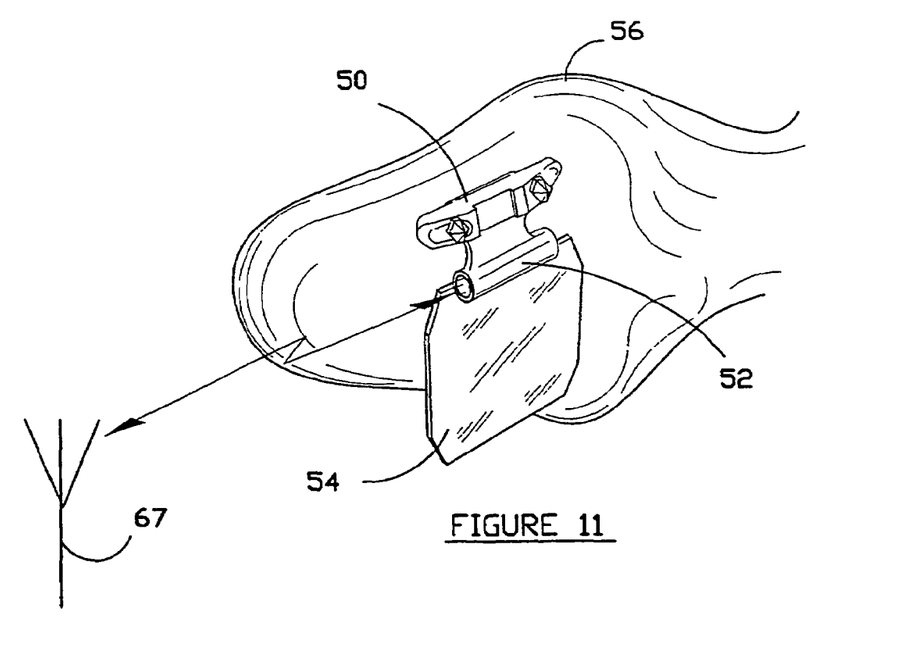
FIG. 11 shows the animal tag of FIG. 10 applied to the ear of a cow.

Referring to FIGS. 10 and 11, the alternative form of tag shown therein differs from that in the previous drawings in that the locking component 50 includes a tubular holder 52 attached directly to the locking component. In turn, a marker or flag 54 is attached to the tubular holder.

The tubular holder forms a housing for the transponder 57 having a coiled antenna with the axis of the coils in line with the axis of the tubular holder.

As can be seen from FIG. 11, the tag can be applied in a similar manner to that described with reference to the earlier drawings with the marker tubular holder and transponder hanging down from within the ear. Here the tag is applied in a depression between the vascular ridges, on the upper rostral surface of the ear pinna. This form of tag is likely to be more suitable for application to cattle.

Because of the direction of the coils, it is preferred that a vertical aerial running perpendicular to the axis of the coils or in other words parallel to the plane of the coils be used to send signals to the transponder.

Figure 12:
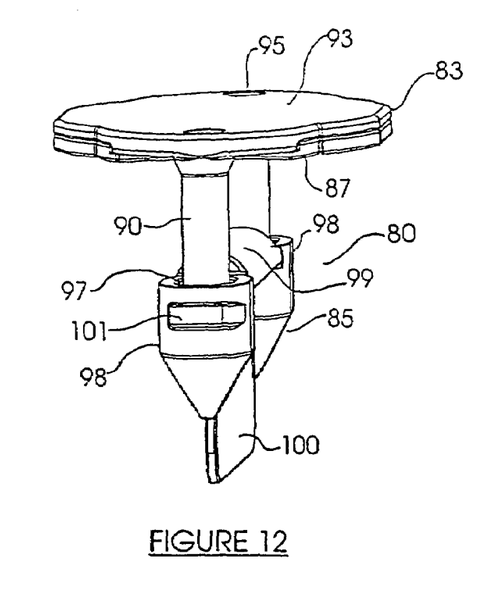
FIG. 12 shows an isometric view of an alternative animal tag assembled.
Figure 13:
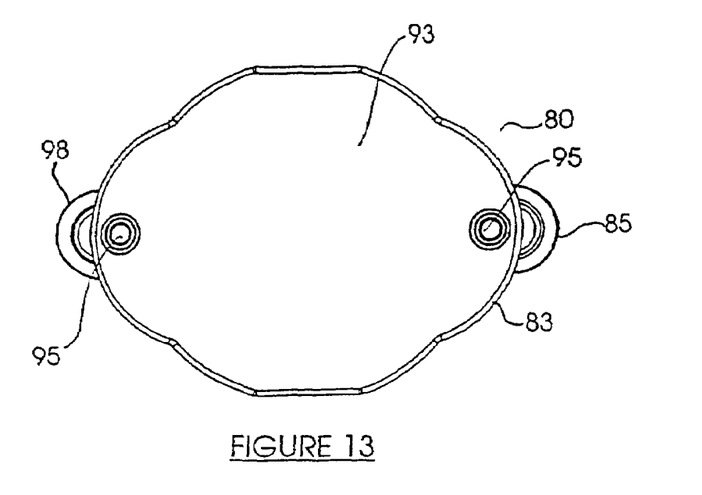
FIG. 13 shows a plan view of the animal tag of FIG. 12.
Figure 14:
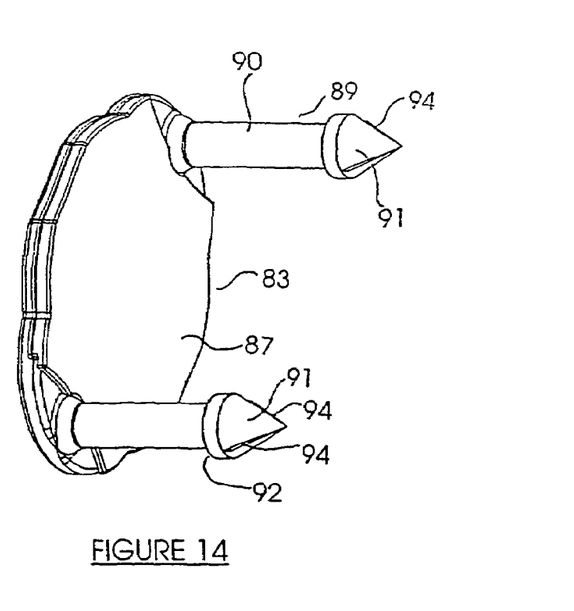
FIG. 14 shows an isometric view of the penetrating component of the tag of FIG. 12.

Referring to FIGS. 12 to 14 there is shown an alternative construction of animal tag 80 in accordance with the invention which comprises a penetrating component 83 and a locking component 85. As in the case of the previously described animal tags, it is expected that both of these components may substantially comprise integral units formed of moulded plastics material.

A transponder cap 87 may be fitted in abutment with and immediately underneath the joining strip 93 of the penetrating component sandwiching a transponder between the two. It may be attached by heat welding, ultrasonic welding, gluing or even by a mechanical snap-fit arrangement.

The broad upper surface of the joining strip 93 by overlying the transponder protects it and also provides a useful area on which writing or other identification markings and information may be applied in a location where it is readily visible.

The locking component has two ear penetrating members 89 comprising a tubular portion 90 and an ear piercing head 91. The ear piercing head forms a step 92 with its join to the tubular portion so that the step may act to lock the penetrating component onto the locking component when the two are pushed together with the ear of an animal sandwiched therebetween.

The ear piercing heads each include two flanges 94 which act as knife edges to assist the heads to penetrate the ear of an animal.

Each of the ear penetrating members is provided with an opening 95 allowing access to the interior of the tubular portion 90 for the prongs of an application tool which hold the ear penetrating members rigid when they are pushed through the ear of an animal.

The locking component is provided with two openings for receiving the ear piercing heads 91. Suitably the openings are in the form of locking slots 97. The width of the locking slots may be slightly less than the maximum width of the ear piercing heads so that the ear piercing heads may be retained in abutment with the edges of the locking slots when the two components are pushed together.

Each of the locking slots is provided with a cap 98 which surrounds the ear piercing head and hence acts as a "tamper-resistant" feature by preventing access to the ear piercing head after it has been locked in place. This reduces the likelihood that a farmer would transfer the component holding the transponder to another animal.

A joining portion 99 extends between the two locking slots and associated caps. The joining portion is domed above the level of the locking slots and caps. As a result, it acts as a spacer to create an increased air gap between the ear of an animal and the region where the ear piercing heads have pierced the ear so as to provide good air circulation and thus reduce the incidence of infection.

A marker/flag 100 is mounted between the two caps and beneath the joining portion 99. The marker/flag may also include markings for identification, etc. A slot (not shown) may be provided between the marker/flag 100 and joining portion 99 and slots 101 may be provided on each of the caps. The purpose of these slots is to assist with application by a tag applicator gun.

Referring to FIGS. 15 to 19, there is shown a further version of animal tag 120 comprising a penetrating component 123 and locking component 125.

The animal tag is fitted with a transponder cap 127 which can be fitted underneath the joining strip 133 or in a housing partially defined by the recess 152 in the marker/flag 145. This cap sandwiches a transponder 128 between the transponder cap and joining strip.

As in the previous cases, the penetrating component has two ear penetrating members 129 fitted with ear piercing heads (not shown), the ear piercing heads being shaped so that they can be driven into and locked within slots (not shown) at the top of the caps 138.

Adjoining portion 139 extends between the caps and acts as a spacer in the manner previously described.

Similarly, slots 141 and 142 are provided to assist with application of the tag by an applicator gun.

The marker/flag 145 comprises a cover portion 147 and a retainer portion 149 joined by a hinge 150. Thus, the cover portion may be bent about the hinge to overlie the retainer portion and close off the recess 152 to form a housing within which the transponder may be retained.

Projections 154 on the cover portion fit into the socket holes 156 of the retainer portion and may be secured within the holes by conventional means such as heat welding, ultrasonic welding, gluing or mechanical locking. Thus, it is an easy matter to insert a transponder within the recess 152 and to retain the transponder therein by folding over the cover portion and securing it in abutment with the retainer portion.

The cover portion may include locater projections 158 to assist with holding or locating a transponder held within the recess 152.

Referring to FIGS. 20, 23, 24 and 25 it can be seen that an animal tag along the lines of that described with reference to numeral 120 previously has been applied to the ear 160 of a cow. The application of the tag has been to the vertical part of the cow's ear with the marker/flag extending below the level of the ear so as to be visible.

Figure 15:
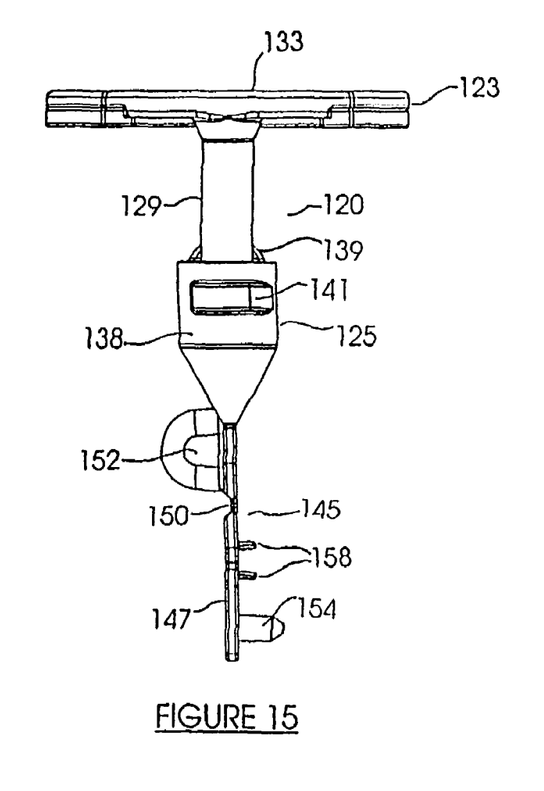
FIG. 15 shows a side on view of another alternative form of tag.
Figure 16:
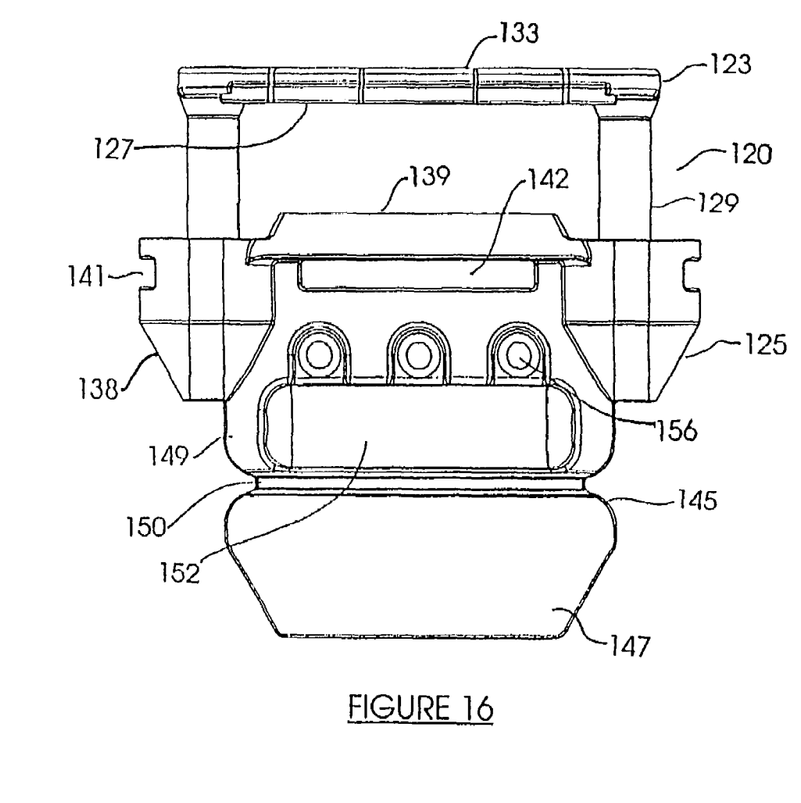
FIG. 16 shows a plan view of the tag of FIG. 15.
Figure 17:
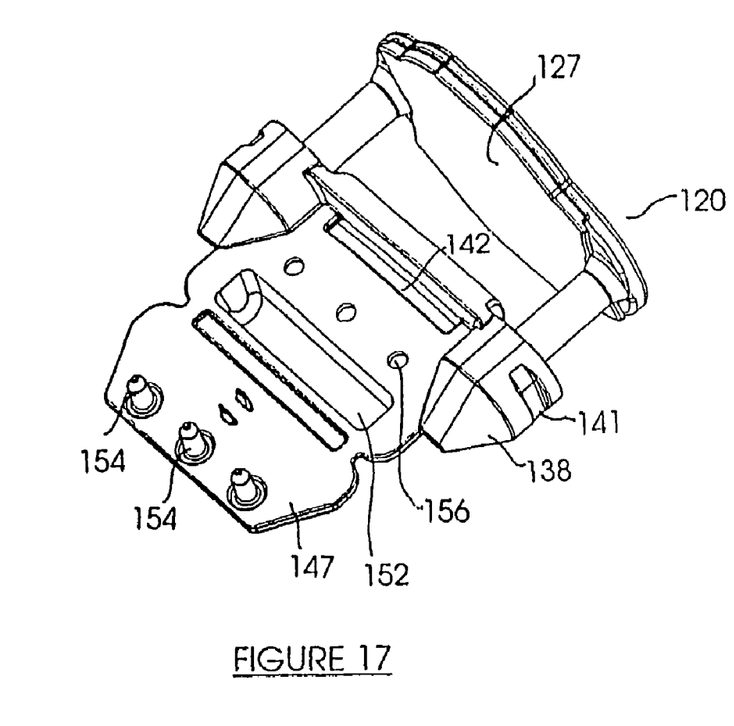
FIGS. 17 and 18 show isometric views from opposite sides of the tag of FIG. 15.
Figure 18:
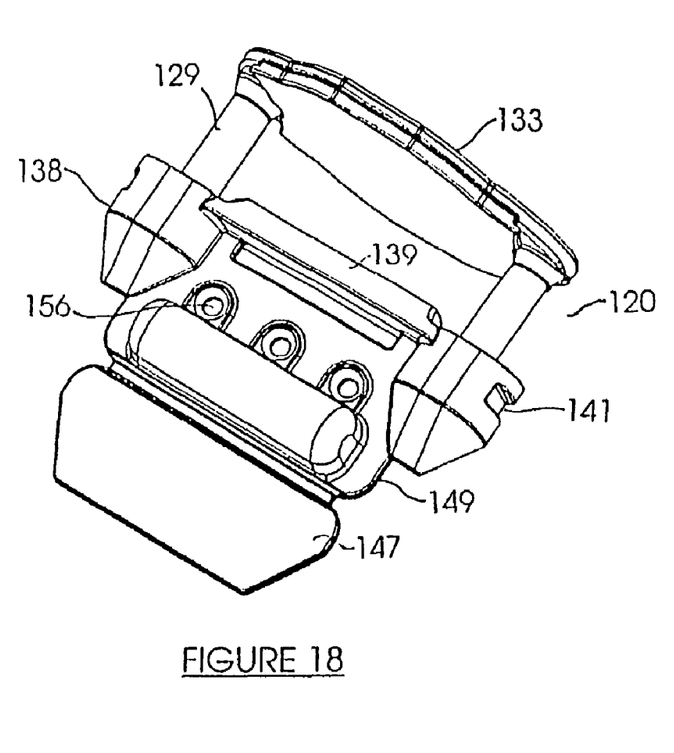
Figure 19:
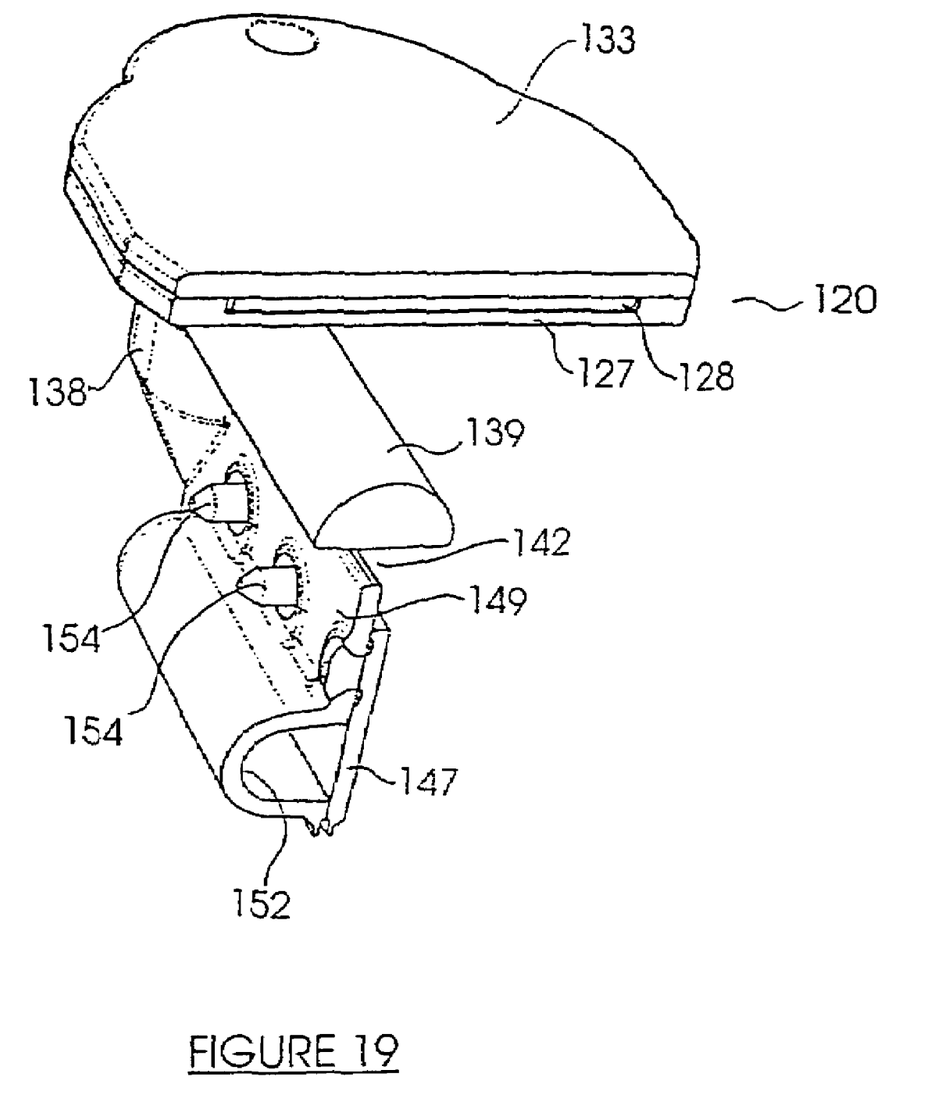
FIG. 19 shows a fragmentary sectional view of the tag of FIG. 15 when assembled.
Figure 20:
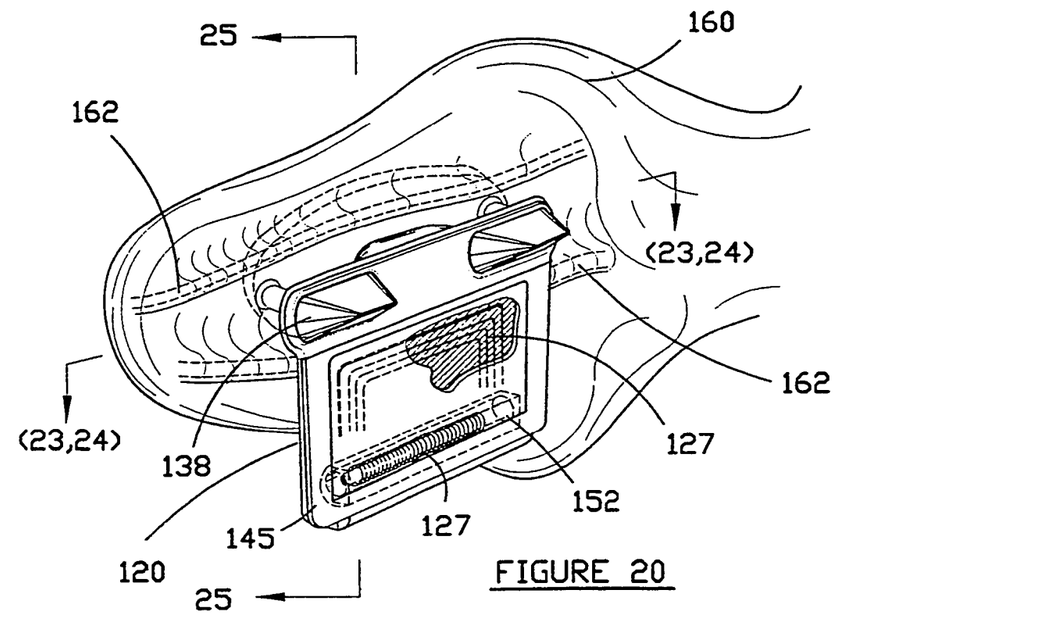
FIG. 20 shows an isometric view of a tag applied to the ear of a calf or cow.

The joining portion 139 of the tag sits between two of the parallel veins 162 of the ear, the ear penetrating members having also been applied through the region between the two veins 162. Thus, the domed joining portion 139 sits in a hollow 163 formed between the vascular ridges/veins and acts as a spacer to allow air to circulate around the wound of the ear caused by the ear penetrating member in the region of the ear piercing head and capsule. The transponder 127 may sit within the recess 152 or it may comprise a flat coil sandwiched between the two portions 147 and 149 or beneath the joining strip 133 as shown in FIGS. 15 and 16.

Figure 21:
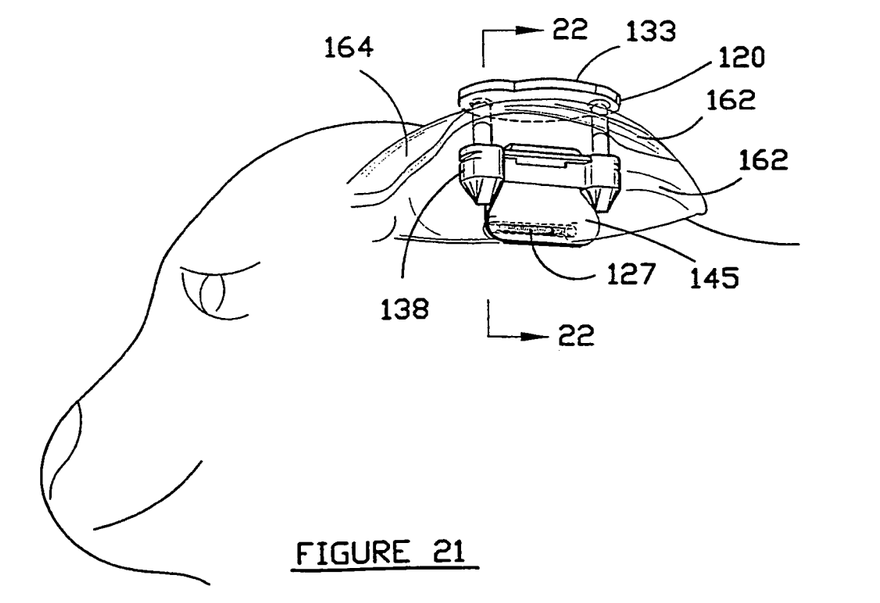
FIG. 21 shows an isometric view of a tag applied to the ear of a sheep.
Figure 22:
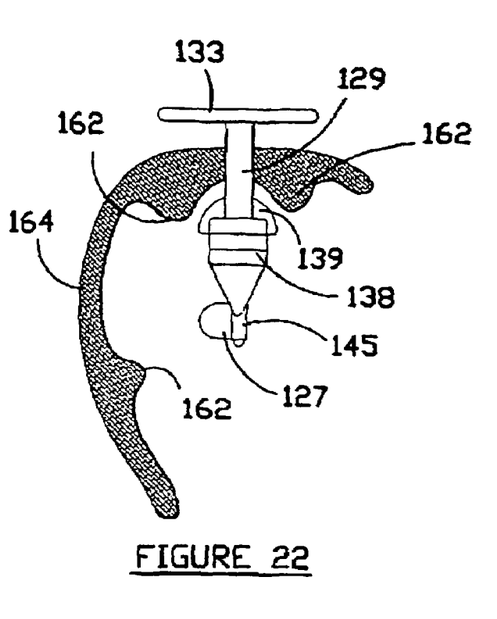
FIG. 22 shows the section 22-22 taken on FIG. 21.

Referring to FIGS. 21 and 22, it can be seen that an animal tag 120 has been applied to the top of the sheep's ear 164 between two veins 162 to provide an effective means of animal identification. Whilst the transponder is shown as being retained in the recess, it is to be appreciated that the transponder for the sheep's ear may equally be located beneath the joining strip 133. Typically, a higher frequency transponder may be used beneath the joining strip or lower frequency transponder in the recess 152 depending upon the requirements of a user and the radio and other identification equipment available to the user.

Figure 23:
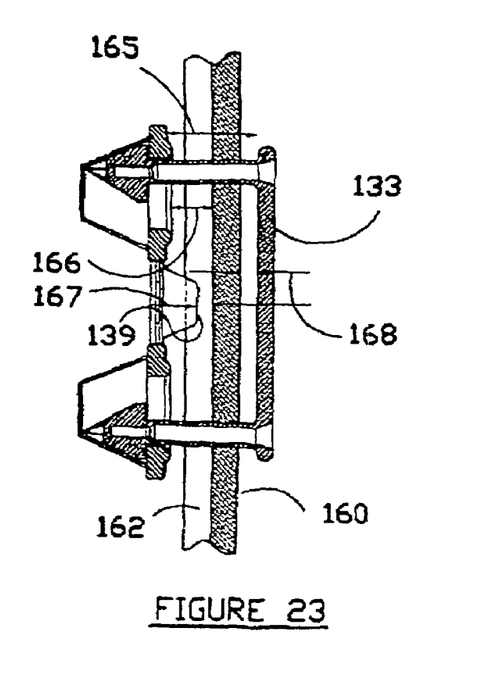
FIGS. 23 and 24 show the sections (23, 24)-(23, 24) taken on FIG. 20 for a calf and respectively.
Figure 24:
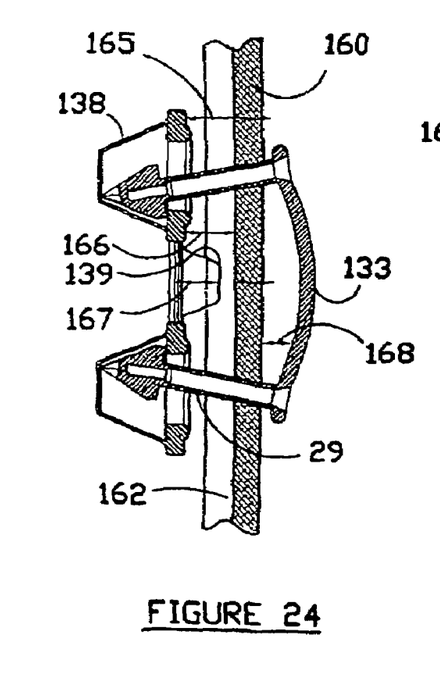
Figure 25:
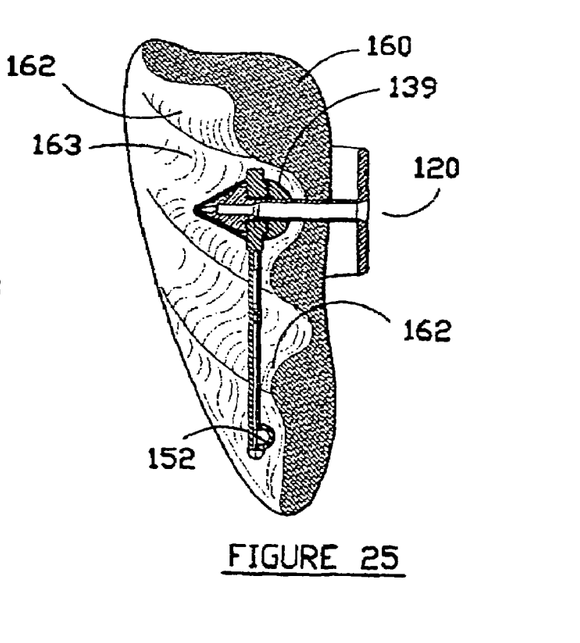
FIG. 25 shows the section 25-25 taken on FIG. 20.

It can be seen that the animal tag may adjust as an animal grows from the illustrations in FIGS. 23 and 24. Thus, when the animal is small as shown in FIG. 24, the joining strip 133 is bulged and the ear penetrating members 129 are angled towards each other. As the animal grows, the ear widens, the bulge flattens and the ear penetrating members assume a parallel configuration as shown in FIG. 23. During the entire growth of the animal, there are range of gaps between the tag and the ear which allow a degree of air circulation and hence assist with healing of the ear after application of the tag. A typical range of gap sizes for a member of the bovine family is shown hereunder.

| Gap Number | Gap Size |
| --- | --- |
| 165 | 10 mm to 26 mm |
| | Preferably 12 mm to 20 mm |
| 166 | 6 mm to 14 mm |
| | Preferably 8 mm to 12 mm |
| 167 | 0 mm to 12 mm |
| | Preferably 4 mm to 10 mm |
| 168 | 0 mm to 15 mm |
| | Preferably 0 mm to 8 mm |

Whilst the above description includes the preferred embodiments of the invention, it is to be understood that many variations, alterations, modifications and/or additions may be introduced into the construction and arrangements of parts previously described without departing from the essential features or the spirit or ambit of the invention.

It will be also understood that where the word "comprise", and variations such as "comprises" and "comprising", are used in this specification, unless the context requires otherwise such use is intended to imply the inclusion of a stated feature or features but is not to be taken as excluding the presence of other feature or features.

The reference to any prior art in this specification is not, and should not be taken as, an acknowledgement or any form of suggestion that such prior art forms part of the common general knowledge in Australia.

The invention claimed is:

1. An animal tag comprising,
a penetrating component having two ear penetrating members joined by a strip of intermediate material,
a complementary component having a locking portion for each penetrating member, and
a joining portion extending between and joined to the locking portions,
wherein the arrangement is such that the ear penetrating members are designed to be passed through the ear of an animal and to lock into the locking portions to sandwich the ear within a gap between the penetrating component and complementary component and the joining portion extends into the gap to act as a spacer between the ear and complementary component to provide air circulation regions directly open to the atmosphere about the two ear penetrating members.

2. The animal tag according to claim 1 wherein each ear penetrating member comprises a skin penetrating head joined to the strip of intermediate material by a tubular portion, the join between each skin penetrating head and tubular portion being formed as shoulder adapted to cooperate with one of the locking portions to lock the penetrating component and complementary component together.

3. The animal tag according to claim 2 wherein each skin penetrating head comprises a central supporting portion of moulded plastics material provided with at least two thin flanges extending from the central supporting portion, the at least two thin flanges having sharp edges and meeting at a sharp point forward of the supporting portion.

4. The animal tag according to claim 3 wherein each of the locking portions comprises a cap which substantially covers and surrounds each skin penetrating head.

5. The animal tag according to claim 1 wherein the strip of intermediate material comprises plastic material which is sufficiently flexible to be bent from a substantially flat configuration when regions of the ear penetrating members joined to the strip of intermediate material are at their maximum separation to a looped configuration when the regions of the ear penetrating members are squeezed towards each other.

6. The animal tag according to claim 1 having attached thereto at least one of, a flag, a transponder, any form of data concerning the animal to which the animal tag is attached, any form of diagnostic device, electronic device, any form of treatment device, a chemical agent, any form of signalling device, and any form of locating device.

7. The animal tag according to claim 6 having attached thereto a flag and a transponder.

8. The animal tag according to claim 7 wherein the transponder is housed in a housing attached to the flag.

9. The animal tag according to claim 8 wherein the housing comprises a first housing component having a recessed portion and second housing component joined to the first housing component by a hinge, whereby the first and second housing components may be folded into overlapping relationship to cover the recess and so form the housing.

10. The animal tag according to claim 7 wherein the transponder comprises a wafer secured beneath the strip of intermediate material and between the two ear penetrating members.

11. The animal tag according to claim 1 wherein each locking portion comprises a slot and each penetrating member comprises a skin penetrating head for passing through the slot.

* * * * *